United States Patent
Moberg et al.

(10) Patent No.: US 8,213,353 B2
(45) Date of Patent: Jul. 3, 2012

(54) REPEATER GAIN CONTROL METHOD AND APPARATUS

(75) Inventors: Peter Moberg, Stockholm (SE); Pål Frenger, Linköping (SE); Thomas Rimhagen, Linköping (SE); Riikka Susitaival, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 387 days.

(21) Appl. No.: 12/547,773

(22) Filed: Aug. 26, 2009

(65) Prior Publication Data

US 2011/0053602 A1    Mar. 3, 2011

(51) Int. Cl.
*H04B 7/14* (2006.01)
(52) U.S. Cl. .................. 370/315; 370/328; 455/11.1
(58) Field of Classification Search .................. None
See application file for complete search history.

(56) References Cited

U.S. PATENT DOCUMENTS

| | | | |
|---|---|---|---|
| 2003/0220075 A1* | 11/2003 | Baker et al. | 455/17 |
| 2010/0009625 A1* | 1/2010 | Chami et al. | 455/11.1 |
| 2010/0080164 A1* | 4/2010 | Power et al. | 370/315 |
| 2010/0316092 A1* | 12/2010 | Hannan et al. | 375/142 |
| 2010/0329311 A1* | 12/2010 | Hannan et al. | 375/149 |

FOREIGN PATENT DOCUMENTS

WO  WO 2008/068479 A2 *  6/2008
WO  WO 2009/076995 A1     6/2009

\* cited by examiner

*Primary Examiner* — Bob Phunkulh

(57) ABSTRACT

This document proposes soft activation and inactivation of (network) repeaters that are, for example, activated on an as-needed basis. With soft activation, repeater gain ramps upward at a controlled rate, thereby avoiding rapid changes in interference caused by the repeater. Likewise, with soft inactivation, repeater gain ramps downward at a controlled rate. Soft activation/inactivation results in more gradual changes in the interference contribution of the repeater, thereby improving the performance of interference-compensating radio receivers operating in proximity to the repeater.

21 Claims, 7 Drawing Sheets

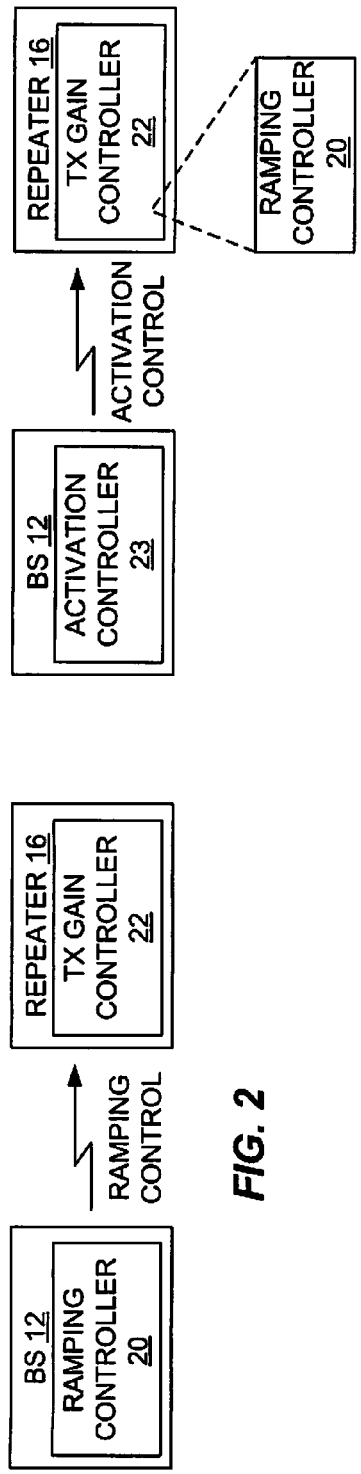
FIG. 2
FIG. 3
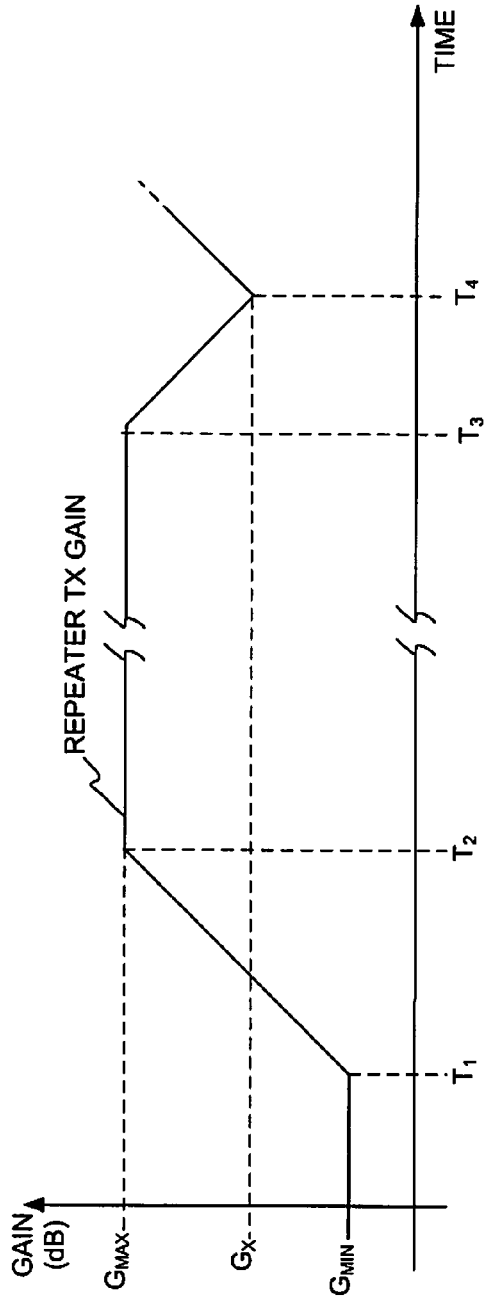
FIG. 4

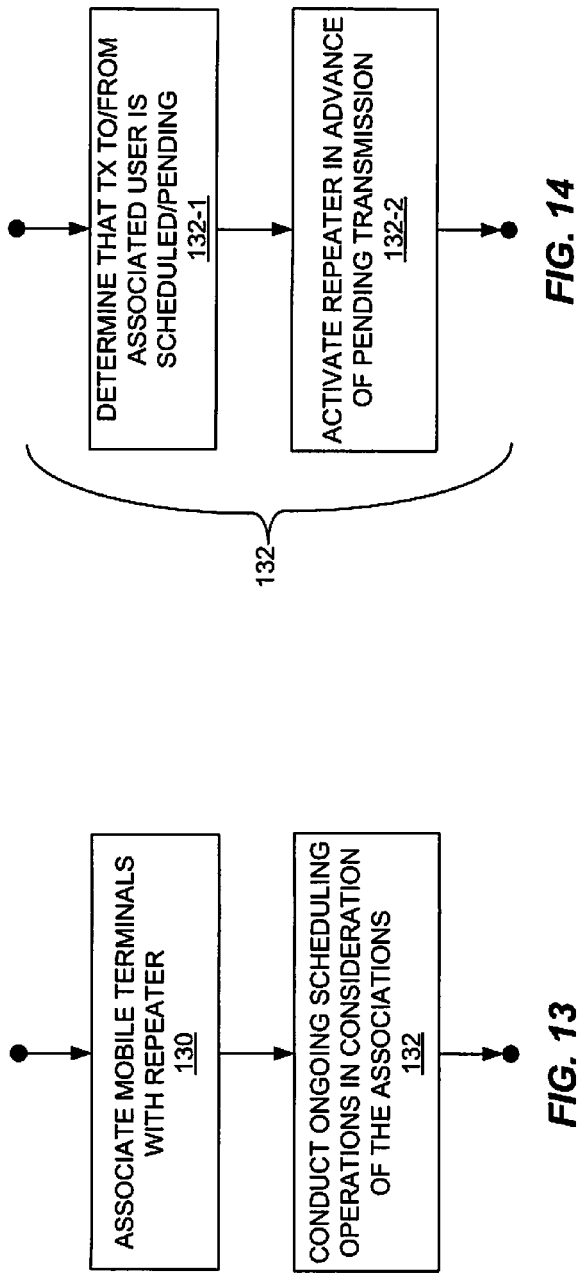
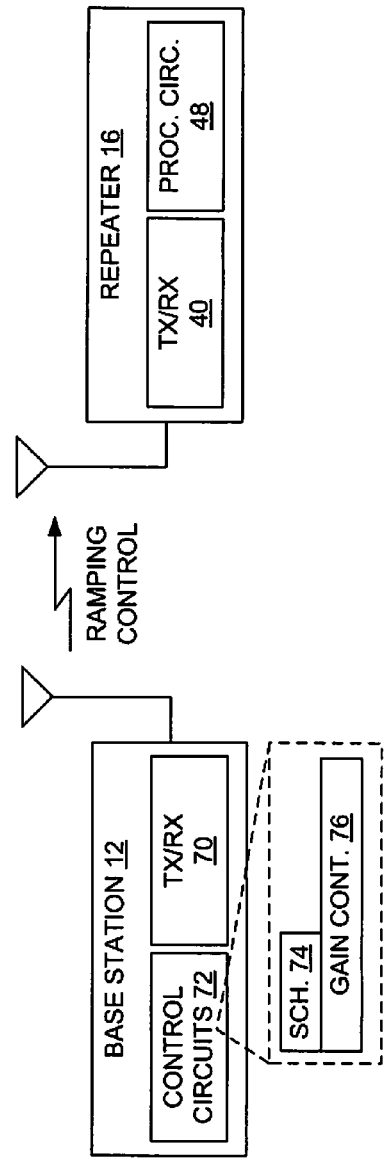

REPEATER GAIN CONTROL METHOD AND APPARATUS

FIELD OF THE INVENTION

The present invention generally relates to repeaters, such as used in wireless communication networks, and particularly relates to soft activation and inactivation of repeaters.

BACKGROUND

Network repeaters play an increasingly important role in wireless communication networks. While traditional repeater installations extended general radio service into areas not well covered by a network's fixed base stations, designers now view repeaters as an effective mechanism for extending high bit rate services to cell edge users, and in other scenarios where high data rate users do not have line-of-sight (LOS) service to a controlling base station.

As a non-limiting example, a controlling base station may provide sufficient signal strength in a given service area for low-rate data and control signaling, but may rely on one or more repeaters for extending high data rate services into that area. LTE Advanced, IEEE802.16j/m, and other next-generation wireless communication systems contemplate such scenarios.

"Always on" repeater configurations leave a repeater's receive/transmit circuitry on continuously at an operational gain level, meaning that the repeater is always available for signal repeating, but also meaning that the repeater burns power without regard to whether any users actually need the repeater for service coverage. In such cases, the repeater's transmissions represent an unnecessary source of interference within the network, which can detract from overall uplink/downlink capacity.

While the always-on configuration may make sense in installations where a repeater extends general radio service, it is much less sensible in cases where the repeater acts as a booster for high-rate services. In such cases, from power consumption and interference considerations, it is more desirable to operate the repeater on an as-needed basis. That is, the repeater is selectively activated only when needed to repeat high-rate service signals to and/or from high-rate users operating within a coverage area of the repeater. However, it is recognized herein that activating and inactivating repeaters in this manner results in potentially significant disruptions in the background interference perceived by other radio receivers operating within the wireless communication network.

SUMMARY

This document proposes soft activation and inactivation of (network) repeaters that are, for example, activated on an as-needed basis. With soft activation, repeater gain ramps upward at a controlled rate, thereby avoiding rapid changes in interference caused by the repeater. Likewise, with soft inactivation, repeater gain ramps downward at a controlled rate. Soft activation/inactivation results in more gradual changes in the interference contribution of the repeater, thereby improving the performance of interference-compensating radio receivers operating in proximity to the repeater.

In one embodiment, the repeater implements ramping control responsive to activation/inactivation signaling from a controlling base station, or responsive to detecting transmissions that are to be repeated. In another embodiment, the controlling base station implements ramping control, and the repeater ramps up or down responsive to ramp control signaling from the controlling base station.

In either case, ramping preferably is based on a defined ramping profile, which can be preconfigured, or can be dynamically adapted. In its simplest implementation, the defined ramping profile includes a defined gain step and time step, such that repeater gain steps upward at a defined rate in response to activation, and steps downward at the same defined rate in response to inactivation. In another embodiment, the defined ramping profile includes an activation ramp and an inactivation ramp, i.e. different profiles for activation and inactivation. In yet another embodiment, the repeater repeats both downlink and uplink signals, and the defined ramping profile includes a downlink activation ramp, an uplink activation ramp, a downlink inactivation ramp, and an uplink inactivation ramp. The rate (slope) can be different for each such ramp, and the ramping parameters (e.g. gain/time steps) can be statically set or dynamically adapted.

Notably, in one or more embodiments, a controlling base station is configured to time or otherwise schedule transmissions to repeater-supported users in consideration of the repeater's soft activation/inactivation behavior. For example, in an LTE Advanced or other high-rate wireless communication network, a given repeater may be activated as needed, to provide high bit rate service to one or more particular users, and the controlling base station may activate the repeater in advance of transmitting to the user(s), thereby allowing the repeater time to carry out soft activation before high-rate transmissions to the user(s) begins. More broadly, one or more embodiments of a controlling base station are configured to consider a repeater's soft activation/inactivation timing in user transmission scheduling (uplink and/or downlink).

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 2 is a block diagram of one embodiment of a base station and a repeater, where the repeater is configured to implement transmit gain ramping responsive to a base station ramping controller.

FIG. 3 is a block diagram of one embodiment of a base station and a repeater, where the repeater is configured to implement transmit gain ramping responsive to an included ramping controller.

FIG. 4 is a plot of one embodiment of soft activation and inactivation of repeater transmit gain.

FIGS. 13 and 14 are logic flow diagrams of one embodiment of user scheduling at a base station, in consideration of the soft activation/inactivation timing of a repeater.

FIG. 15 is a block diagram of a base station configured to carry out user scheduling in consideration of the soft activation/inactivation timing of an associated repeater.

DETAILED DESCRIPTION

Figure 1:
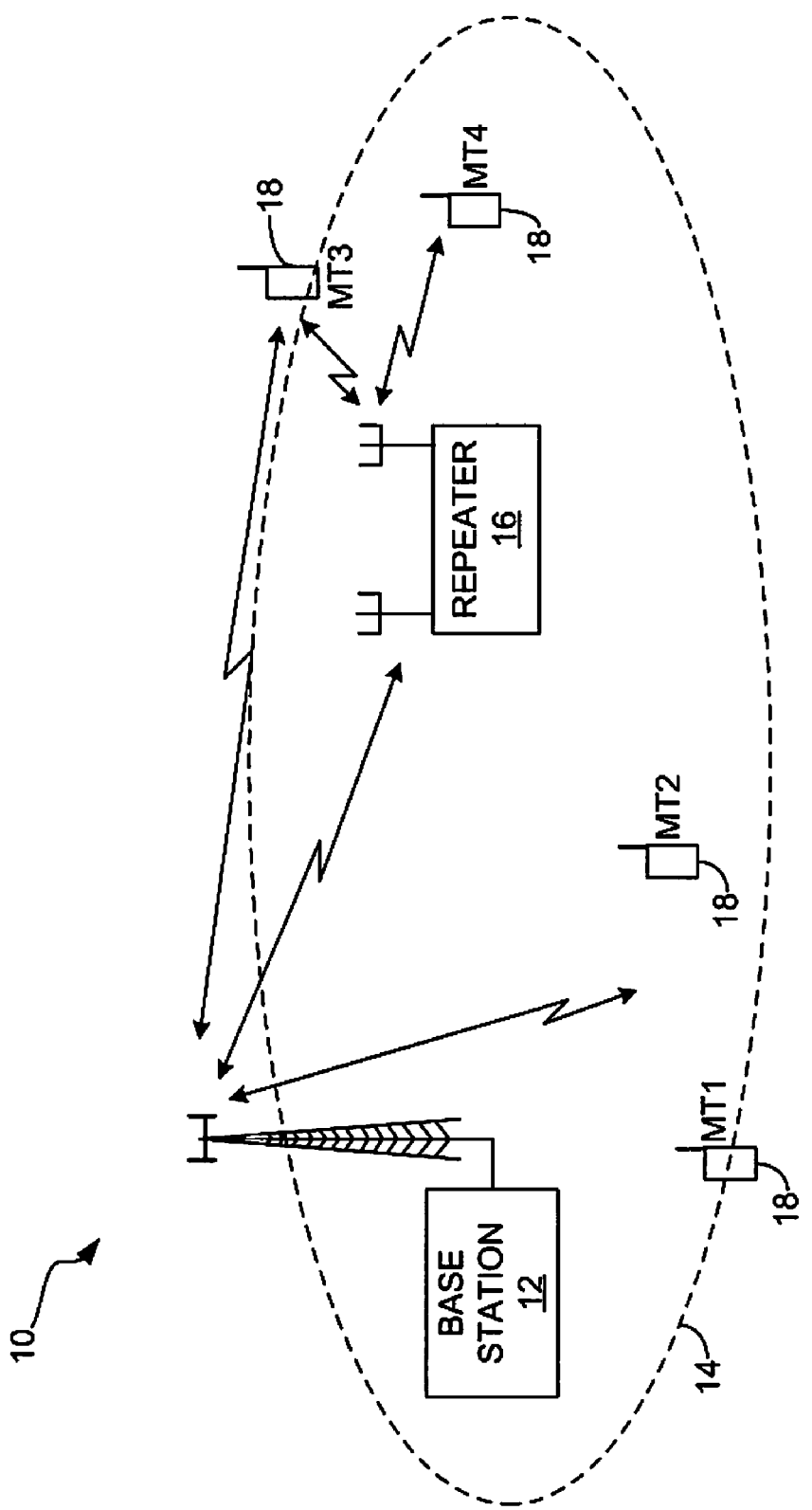
FIG. 1 is a block diagram of one embodiment of a wireless communication network, including a base station and a repeater, where the repeater is configured for soft activation/inactivation.

FIG. 1 depicts one embodiment of a wireless communication network 10, which includes a number of base stations 12, each providing radio service over one or more defined coverage areas 14. For simplicity, the diagram depicts one base station 12 and one coverage area 14, hereinafter referred to as a "cell" for convenience. The diagram additionally illustrates a repeater 16, which enhances or otherwise extends the base station's service coverage.

Correspondingly, one sees that the base station 12 directly serves one or more mobile terminals or other user equipment 18, and indirectly serves one or more other mobile terminals 18 through the repeater 16. In the illustration, the two mobile terminals 18 identified as "MT1" and "MT2" are served by the base station 12 directly, while the two mobile terminals 18 identified as "MT3" and "MT4" are served by the base station 12 through the repeater 16.

In fact, as those skilled in the art will appreciate, any one of the mobile terminals 18 may receive signals from both the base station 12 and the repeater 16. However, as a general proposition, the repeater 16 extends or otherwise improves base station coverage on the downlink and/or the uplink for a given area within the cell 14. Further, in at least one embodiment of the network 10, the repeater 16 is used on a selective basis, such as to extend high-rate data services. For example, in one or more embodiments, the repeater 16 is configured to boost high-data rate transmissions to and/or from MT3 and MT4, and operates on a selective basis where it is active when needed for such transmissions and otherwise inactive. "Active" means on and operating at a maximum or otherwise meaningful transmit gain, while inactive means off and operating at a transmit gain of zero, or otherwise operating in a standby condition where the transmit gain is at some minimum gain level.

In any case, the repeater 16 uses soft activation and soft inactivation, rather than hard activation/inactivation. With hard activation/inactivation, a repeater turns on by abruptly switching its transmit gain from zero or a minimum value to a maximum or on value, and likewise abruptly drops its transmit gain when inactivated. In contrast, the repeater 16 is configured according to the present invention to use a controlled upward (downward) ramping of its transmit gain responsive to activation (inactivation).

FIG. 2 illustrates one embodiment wherein the base station 12, operating in a controlling base station role with respect to the repeater 16, includes a ramping controller 20 that is configured to generate ramping control signals, which are transmitted via control signaling from the base station 12 to the repeater 16. Correspondingly, the repeater 16 includes a transmit gain controller 22, which effects activation and inactivation ramping of the repeater's transmit gain in response to ramping control signaling from the base station 12.

In another embodiment, shown in FIG. 3, the transmit gain controller 22 of the repeater 16 includes an embodiment of the ramping controller 20. In such embodiments, the repeater 16 may be configured to autonomously carry out activation/inactivation ramping, although it may do so in response to activation/inactivation signaling from the base station 12. For example, the base station 12 may include an activation controller 23, which is configured to initiate activation/inactivation of the repeater 16. However, in at least one embodiment, the repeater 16 activates and inactivates automatically, responsive to detecting the transmission of signals that are to be repeated. For example, the repeater 16 is configured to detect certain transmissions from the base station 12 and/or from particular ones of the mobile terminals 18.

Further, in one or more embodiments, the network 10 comprises an LTE Advanced network, the base station 12 comprises an "eNB" configured for LTE Advanced operation, the repeater 16 comprises an LTE Advance repeater, and the mobile terminals 18 comprise LTE Advanced mobile terminals. In another embodiment, all such entities are configured for IEEE802.16j/m operation. Of course, those skilled in the art will appreciate that these examples are non-limiting embodiments. More broadly, the repeater soft activation/inactivation teachings presented herein provide advantages in a number of different types of wireless communication networks, such as in any network where fast changes in the level of interference are disruptive to one or more link adaptation processes.

With that broad applicability in mind, FIG. 4 illustrates soft activation and soft inactivation for one embodiment of the repeater 16. In the illustrated graph, the vertical axis represents the repeater's transmit gain in dB and the horizontal axis represents time. While time units are not shown, the illustrated behavior may, for example, play out over milliseconds, tens of milliseconds, or even hundreds of milliseconds. Further, the illustrated break in the horizontal axis simply suggests that the repeater 16 is active for some period of time—some activations may be longer or shorter than others—and it should be understood that the repeater 16 operates on an as-needed basis in one or more embodiments. As such, the repeater 16 is repeatedly activated and inactivated as needed, depending on the mix of mobile terminals 18 being supported by the base station 12, their locations within the base station's cell 14, and on the services being provided to those mobile terminals 18.

In particular, the graph can be understood as depicting an activation and a subsequent inactivation. For the activation, the repeater 16 transitions from the inactive state to the active state via a controlled upward ramping of its transmit gain. For the inactivation, the repeater 16 transitions from the active state to the inactive state via a controlled downward ramping of its transmit gain. One sees that the repeater 16 operates at a minimum starting gain value of $G_{min}$ during a period of inactivity in advance of the time $T_1$ on the horizontal axis. (As a non-limiting example, $G_{min}$ may be 0 dB.) The repeater 16 is activated at time $T_1$ and, according to the soft activation teachings presented herein, begins ramping its transmit gain upward from $G_{min}$. At time $T_2$, the repeater 16 reaches a maximum gain $G_{max}$, and operates with that maximum gain while operating in the active state. As a general proposition, the repeater 16 will ramp its gain upward to $G_{max}$, unless it is inactivated before reaching that value.

The elapsed time between $T_1$ and $T_2$ depends on the controlled ramping rate, and the maximum transmit gain $G_{max}$ reached upon ramping completion may be a fixed, absolute transmit gain value or a relative transmit gain value. For example, input/output antenna isolation, received signal power, current operating conditions, etc., all may determine the actual value of $G_{max}$. Further, $G_{max}$ is, in at least some embodiments, dynamically settable, and those skilled in the art will appreciate that the particular value of $G_{max}$ will vary as needed or desired, over different types of repeaters and in different types of wireless networks.

At a later time $T_3$, the repeater 16 is inactivated and begins downward ramping of its transmit gain, according to the soft inactivation teachings presented herein. As a general proposition, the repeater 16 will ramp its transmit gain downward to $G_{min}$, unless it is reactivated before $G_{min}$ is reached. The graph shows that case, where the repeater 16 is activated again at $T_4$, with the transmit gain at some intermediate value $G_x$. Thus, it will be understood that in at least one embodiment activation/inactivation ramping starts at the current value of transmit gain and increments (or decrements) from that current value, subject to minimum and maximum gain constraints.

In at least one embodiment, the base station 12 dynamically or semi-statically controls (via signaling) the minimum and maximum values used, in ramping control of the repeater's transmit gain. For example, in some embodiments the maximum value that upwardly bounds the repeater's transmit gain ramping is set by the hardware and/or stability limitations of the repeater 16, while in other embodiments the base station 12 signals or otherwise indicates the maximum value to be used by the repeater. Similarly, the minimum gain can be zero or some minimal, off-state value, or the minimum can be some other targeted minimum that can be set or otherwise controlled by the base station 12. In at least one embodiment, the controlling base station of a given repeater 16 can set (and change) the minimum and/or maximum values of transmit gain to be used by the repeater 16, such that the repeater ramps up (or down) until such desired values are reached.

Figure 5:
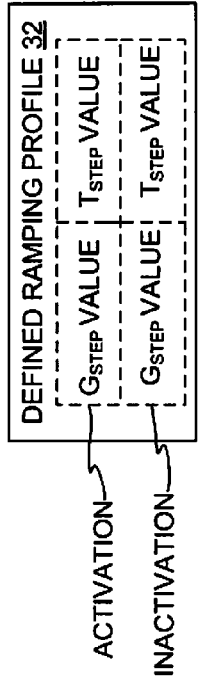
FIGS. 5-8 are block diagrams of several embodiments of a memory or other computer-readable medium storing a defined ramping profile, for use in controlling transmit gain ramping of a repeater.

Of further note, the graph shows smooth upward and downward ramping. Indeed, the repeater 16 and/or the base station 12 may implement ramping control based on smooth ramping. FIG. 5 illustrates a memory or other computer-readable medium 30 implemented in the base station 12 or the repeater 16, which, for example, stores a defined ramping profile 32. In one embodiment, the defined ramping profile 32 comprises at least one ramping function that controls transmit gain ramping by the repeater, for activation and/or inactivation. While some embodiments may use the same ramp for activation and inactivation, FIG. 5 illustrates an activation ramping function $f_1(t)$ and an inactivation ramping function $f_2(t)$, where t represents time. Two ramping functions provide for a different activation ramp, as compared to the inactivation ramp. For example, it may be preferable to ramp upward more aggressively upon activation and ramp downward more slowly upon inactivation.

Figure 6:
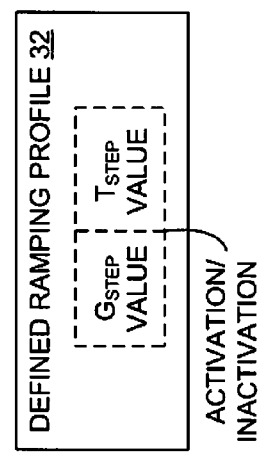
Figure 7:
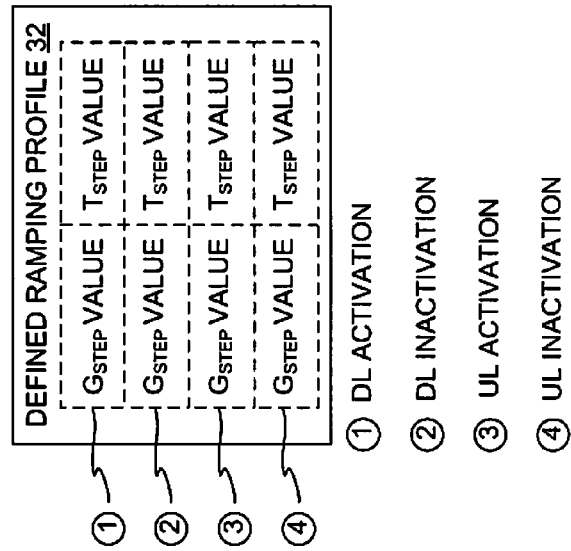
Figure 8:
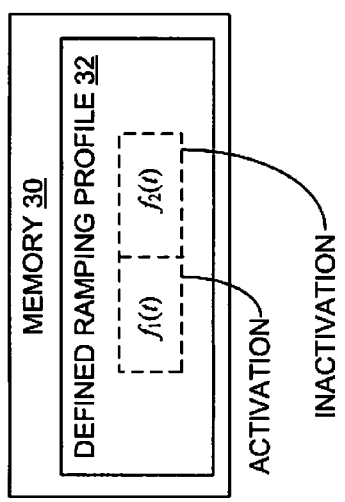

FIGS. 6-8 illustrate other non-limiting examples of the defined ramping profile 32, which, for example, may be stored in the base station 12, or the repeater 16, or copied from the base station 12 to the repeater 16 via signaling. In any case, the defined ramping profile 32 in FIG. 6 is based on a gain step $G_{step}$ and a time step $T_{step}$. Accordingly, activation (inactivation) ramping comprises stepwise incrementing (decrementing) the repeater's transmit gain upward (downward) according to the defined gain and time step values. As a non-limiting value, $G_{step}$ equals one dB, and $T_{step}$ equals one ms.

FIG. 7 expands on this theme, by illustrating the defined ramping profile 32 as comprising different $G_{step}$ and/or $T_{step}$ values for activation and inactivation. That is, the value of $G_{step}$, or $T_{step}$, or both, can be different for activation versus inactivation. In one embodiment, the repeater 16 is configured to use an activation ramp that is steeper than the inactivation ramp.

FIG. 8 illustrates further ramping nuances, where the defined ramping profile includes different values of $G_{step}$ and/or $T_{step}$ for downlink versus uplink activation, and for downlink versus uplink inactivation. That is, in one or more embodiments, the repeater 16 is configured to repeat downlink and uplink signals, and the defined ramping profile of FIG. 8 provides one example of tailoring the soft activation behavior of the repeater 16 differently for downlink versus uplink activation, and differently for downlink versus uplink inactivation. Of course, smooth rather than stepped ramping functions can be used for the same purpose.

More notably, although the ramping behavior is statically defined in one or more embodiments, other embodiments use dynamically adapted ramping behavior. For example, forward and/or reverse link loading conditions may be assessed by the base station 12, the repeater 16, or by another network entity, and the assessment(s) used to select a particular activation/inactivation ramp from the defined ramping profile 32. Thus, in at least one embodiment, the defined ramping profile 32 includes a set of ramping functions or values representing different ramping rates or slopes, such that more or less aggressive ramping can be used to suit prevailing interference conditions.

As a non-limiting example, more (or less) aggressive ramping is used for activation and/or inactivation if it is determined that the repeater-induced changes in cell interference are relatively less (or more) significant for currently prevailing interference conditions. Similar assessments may be made based on determining the number of mobile terminals 18 operating in proximity to the repeater 16. Further, such determinations may consider the type(s) of service mobile terminals are engaged in. For example, one or more of the mobile terminals 18 shown in FIG. 1 generally would be insensitive to the repeater ramping profile if they are engaged in a low-rate ("bursty") service.

Figure 9:
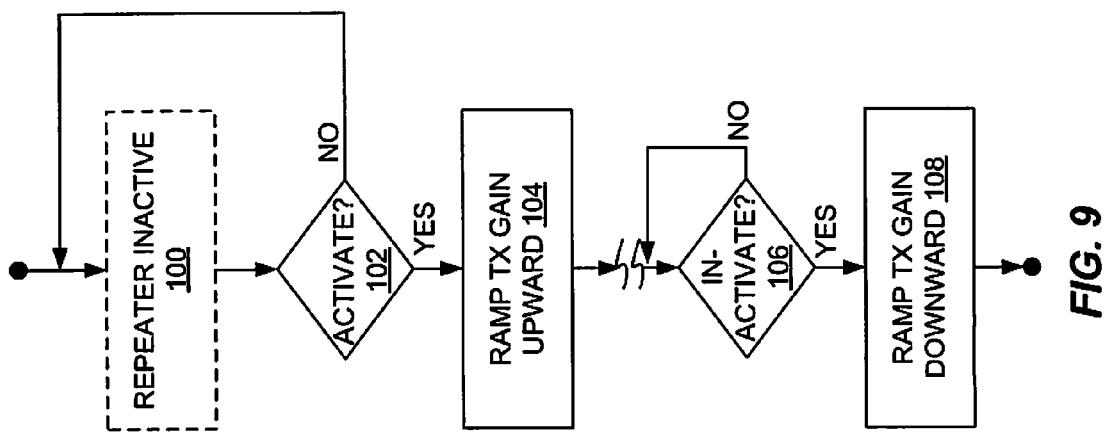
FIGS. 9 and 10 are logic flow diagrams of different embodiments of repeater transmit gain control, for soft activation/inactivation.

Whether one ramp or multiple ramps are used, the repeater 16 implements a method of transmit gain control wherein the repeater 16 is selectively activated and inactivated within the network 10. Broadly, the method comprises ramping a transmit gain of the repeater 16 upward according to a defined ramping profile 32, in response to the repeater 16 being activated, and ramping the transmit gain of the repeater 16 downward according to the defined ramping profile 32, in response to the repeater being inactivated. FIG. 9 illustrates an embodiment of this method.

According to the illustrated method, the repeater 16 is inactive (Block 100). While inactive, the repeater 16 waits or otherwise monitors for an indication that it should activate (Block 102). If the repeater 16 determines that it should activate (YES from Block 102), it ramps its transmit gain upward according to the defined ramping profile (Block 104). While active, the repeater 16 waits or otherwise monitors for an indication that it should inactivate (Block 106). If the repeater determines that it should inactivate (YES from Block 106), it ramps its transmit gain downward (Block 108).

In one embodiment, the above method includes activating the repeater 16 based on detecting, at the repeater 16, signal transmission activity by one or more other particular entities in the network 10, and inactivating the repeater 16 by detecting, at the repeater 16, cessation of the signal transmission activity. As an example, the base station 12 signals to the repeater 16 which downlink transmissions it should repeat, such as by providing Medium Access Control (MAC) identifiers for particular mobile terminals 18, and the repeater 16 activates in response to detecting transmissions by the base station 12 to those particular mobile terminals 18. Additionally, or alternatively, the repeater 16 monitors for uplink transmissions from particular mobile terminals 18, and activates for uplink repeating in response to detecting such transmissions.

In another embodiment, the repeater 16 activates and inactivates based on the repeater 16 receiving activation and inactivation control signaling, respectively, from the base station 12, acting as a controlling base station. For example, the base station 12 may provide downlink and/or uplink scheduling information to the repeater 16, or explicit activation/inactivation signaling to the repeater 16, thereby activating and inactivating the repeater 16 at appropriate times.

In the same or other embodiments, the repeater 16 at least temporarily stores the defined ramping profile 32 as one or more gain step and time step values—e.g. $G_{step}$ and $T_{step}$. In such embodiments, ramping the transmit gain of the repeater 16 upward or downward comprises the repeater 16 incrementing or decrementing the transmit gain according to the gain step and time step values. Further, in at least one such embodiment, the method includes receiving at the repeater 16 the one or more gain step and time step values via signaling from the base station 12, acting as a controlling base station.

Figure 10:
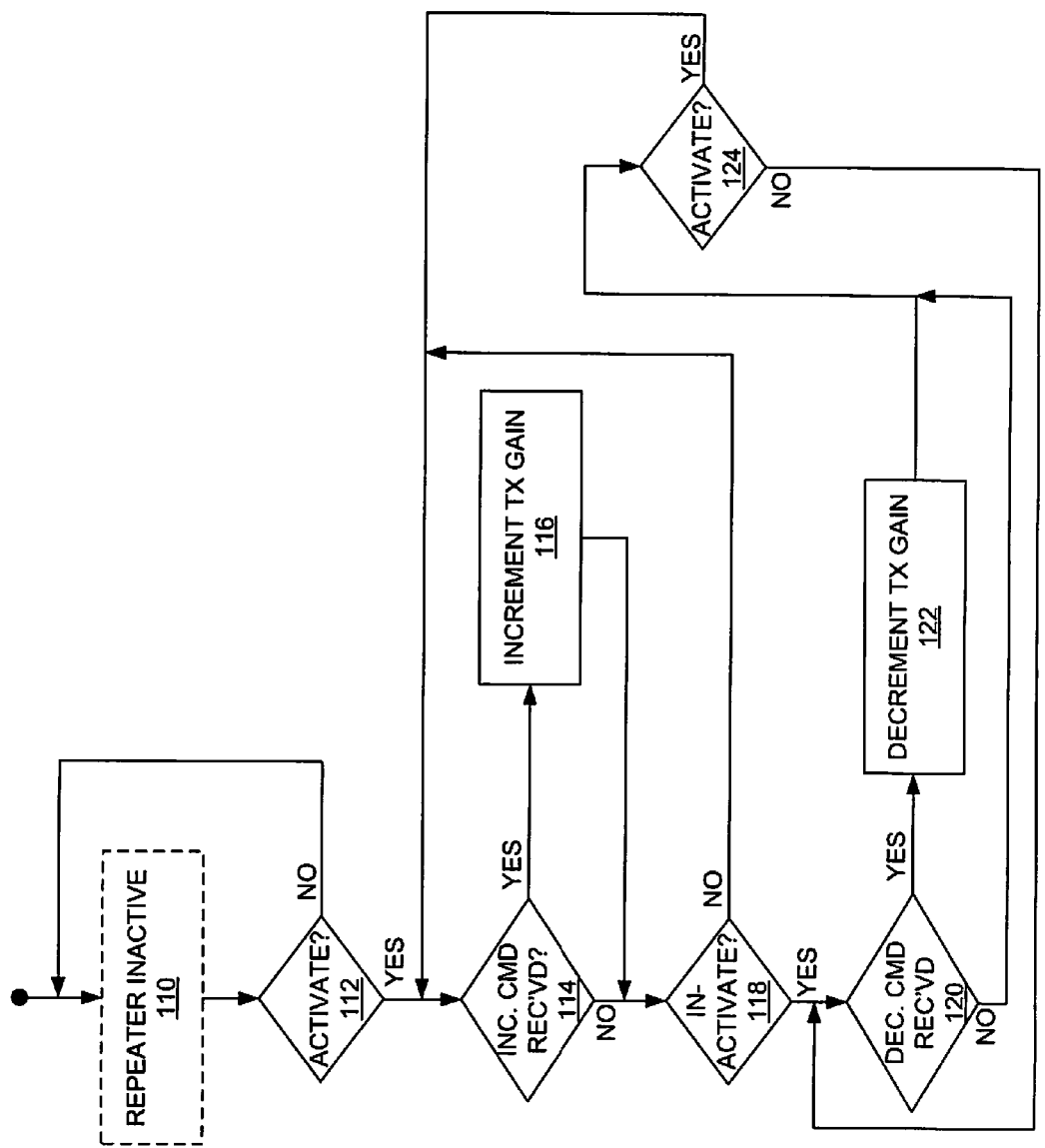

In another embodiment, ramping the transmit gain of the repeater 16 upward or downward comprises the repeater 16 receiving a time sequence of relative upward or downward transmit gain adjustment commands from a controlling base station storing or otherwise having access to the defined ramping profile 32. Referring briefly to FIG. 10, one sees an example of this implementation, wherein it is assumed that the repeater 16 is inactive (Block 110), during which time it monitors for an activation command (Block 112). If such a command is received, the repeater 16 monitors for transmit gain increment commands (Block 114), and increments its transmit gain responsive to receiving such a command (Block 116).

Preferably, the base station 12 times the transmission of the increment commands to effect the desired ramping rate. Further, because the repeater 16 could be inactivated before reaching its maximum transmit gain, it monitors for receipt of an inactivation command (Block 118). If no such command is received, it remains in the gain incrementing loop. If the inactivate command is received, the repeater 16 begins monitoring for receipt of gain decrement commands (Block 120), and correspondingly decrements its transmit gain responsive thereto (Block 122). It also may continue monitoring for activate commands (Block 124).

Returning to the method of FIG. 9, the repeater 16 may be advantageously activated, for example, for high-rate data transmissions on the downlink or uplink where the amount of data to be sent corresponds to a relatively long transmission time in comparison to the ramping operations. (Alternatively, the repeater 16 is ramped up, and then such transmissions are made.) However, as noted, it is possible that the repeater 16 will be inactivated while ramping toward $G_{max}$, or activated while ramping toward $G_{min}$. Thus, in at least one embodiment, in response to being activated while still ramping down the transmit gain from a prior inactivation, the repeater 16 ends the ramping down of the transmit gain and initiates upward ramping of the transmit gain from a current value of the transmit gain. Such operations are done in accordance with the defined ramping profile 32 and subject to a maximum value of the transmit gain.

Similarly, in response to being inactivated while still ramping up the transmit gain from a prior activation, the repeater 16 ends the ramping up of the transmit gain and initiates downward ramping of the transmit gain from a current value of the transmit gain. These operations are carried out in accordance with the defined ramping profile and subject to a minimum value of the transmit gain.

In particular, in one or more embodiments, the repeater 16 is configured for downlink repeater operation in which the repeater 16 is activated for downlink transmissions from a controlling base station 12 to one or more mobile terminals 18. Here, ramping the transmit gain of the repeater 16 upward comprises starting from a minimum value or a last-set value of the transmit gain and incrementing the transmit gain for each succeeding transmit interval in which the repeater is active, subject to reaching a maximum value for the transmit gain. Similarly, ramping the transmit gain of the repeater 16 downward comprises starting from the maximum value or a last-set value of the transmit gain and decrementing the transmit gain for each succeeding transmit interval in which the repeater is inactive, subject to the reaching the minimum value. The number of transmission intervals, such as Transmit Time Intervals (TTIs), that the repeater 16 is active generally will depend on the amount of data to be transmitted/repeated on the downlink.

Additionally, or alternatively, the repeater 16 is configured for uplink repeater operation in which the repeater 16 is activated for uplink transmissions from one or more mobile terminals 18 to a controlling base station 12. Here, ramping the transmit gain of the repeater 16 upward comprises starting from a minimum value or a last-set value of the transmit gain and incrementing the transmit gain for each succeeding transmit interval in which the repeater 16 is active, subject to reaching a maximum value for the transmit gain. Likewise, ramping the transmit gain of the repeater 16 downward comprises starting from the maximum value or a last-set value of the transmit gain and decrementing the transmit gain for each succeeding transmit interval in which the repeater 16 is inactive, subject to reaching the minimum value. "Last-set" value in the above operations should be understood as the current or present value of the transmit gain at the time a downward or upward ramping is initiated.

Figure 11:
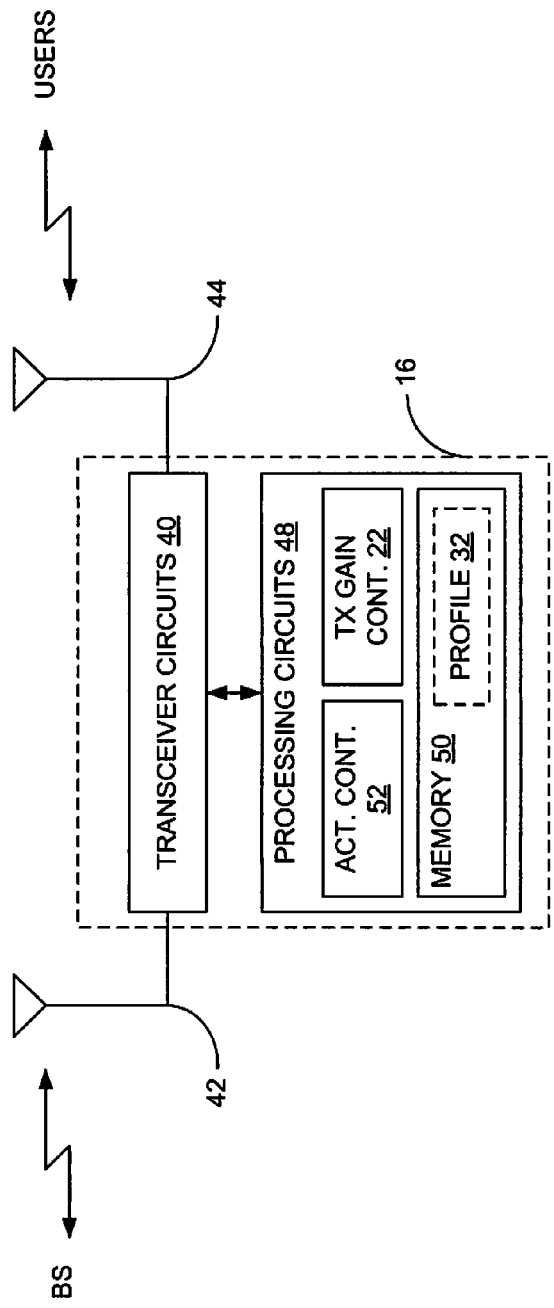
FIG. 11 is a block diagram of one embodiment of a repeater configured for soft activation/inactivation.

In terms of implementing the above methods, and their variations, FIG. 11 depicts an example embodiment of the repeater 16. The illustrated repeater 16 is configured for selective activation and inactivation within the network 10 and it comprises a transceiver 40 having a variable transmit gain for repeating received signals, a transmit gain controller 22 that is configured to ramp a transmit gain of the repeater 16 upward according to a defined ramping profile 32, in response to the repeater 16 being activated, and ramp the transmit gain of the repeater 16 downward according to the defined ramping profile 32, in response to the repeater 16 being inactivated.

Further from the illustration, one sees that the transceiver 40 is coupled to transmit/receive antennas 42 and 44, for receiving signals to be repeated and transmitting them. While antenna details are not shown, those skilled in the art will appreciate that appropriate antenna isolation and filtering are included, as needed, to receive signals on the downlink and/or uplink and retransmit them accordingly. Similarly, the transceiver 40 provides for downlink or uplink repeating, or both, depending upon the desired repeater configuration.

The transmit gain controller 22 is, for example, implemented in one or more processing circuits 48 included in the repeater 16. The processing circuits 48 comprise hardwired circuitry, software-based circuitry, or both, and, regardless, they are particularly configured to implement soft activation/inactivation as proposed herein. For example, in embodiments where the processing circuits 48 comprise microprocessor-based circuits, they include a memory or other computer-readable medium 50 that stores computer program instructions. Execution of the stored computer program instructions configures the processing circuits 48 for soft activation/inactivation methods as taught herein. The memory/medium 50, which may comprise more than one device or storage medium, also may be used to store the defined ramping profile 32, which can be provisioned in the repeater 16, or copied over to the repeater 16 from the base station 12 via signaling. (The defined ramping profile 32 also may be dynamically updated.)

With the above understanding, it will be appreciated that the processing circuits 48 can be programmed or otherwise configured to functionally implement the transmit gain controller 22, which, as described earlier, may include an embodiment of the ramping controller 20 introduced in FIGS. 2 and 3. Further, in at least one embodiment, the repeater 16 includes an activation controller 52.

In one embodiment, the activation controller 52 is configured to activate the repeater 16, where the repeater 16 is active for signal repeating, based on detecting signal transmission activity by one or more other particular entities in the network 10. For example, the activation controller 52 is configured to detect transmissions by the controlling base station 12 and/or one or more particularly identified mobile terminals 18. In such embodiments, the activation controller 52 is further configured to inactivate the repeater 16, where the repeater 16 is not active for signal repeating, based on detecting cessation of the signal transmission activity.

In another embodiment, the activation controller 52 is configured to activate or inactivate the repeater 16, based on receiving activation or inactivation control signaling, respectively, from a controlling base station 12.

In the same or other embodiments, the repeater 16 at least temporarily stores the defined ramping profile 32 as one or more gain step and time step values. Correspondingly, the transmit gain controller 22 ramps the transmit gain of the repeater 16 upward or downward by incrementing or decrementing the transmit gain according to the gain step and time step values. As such, the transmit gain controller 22 can, in such embodiments, be understood as implementing a ramping controller 20, as shown in FIG. 3. In at least one such embodiment, the repeater 16 is configured to receive the one or more gain step and time step values via signaling from a controlling base station 12.

In an alternative embodiment, the transmit gain controller 22 ramps the gain of the repeater 16 upward or downward responsive to the repeater 16 receiving a time sequence of upward or downward transmit gain adjustment commands from a controlling base station 12. In such embodiments, the controlling base station 12 stores or otherwise has access to the defined ramping profile 32. In yet another alternative, the repeater 16 stores a number of alternative ramping profiles, and activation by the base station 12 includes, for example, an indication of which of the stored ramping profiles to use.

As an example, an aggressive ramping profile may be used if the base station 12 knows that there are not any other active mobile terminals in the vicinity of the repeater 16, and a less aggressive ramping profile can be used in case nearby mobile terminals might be disturbed by a sudden change of the repeater 16. In any case, storing different ramping profiles in the repeater 16, which can be pre-configured in the repeater 16, or transferred over from the base station 12, reduces the amount of signaling needed between the base station 12 and the repeater 16, as the base station 12 need only identify which profile to use, rather than signaling all of the parameters needed to define the profile.

Figure 12:
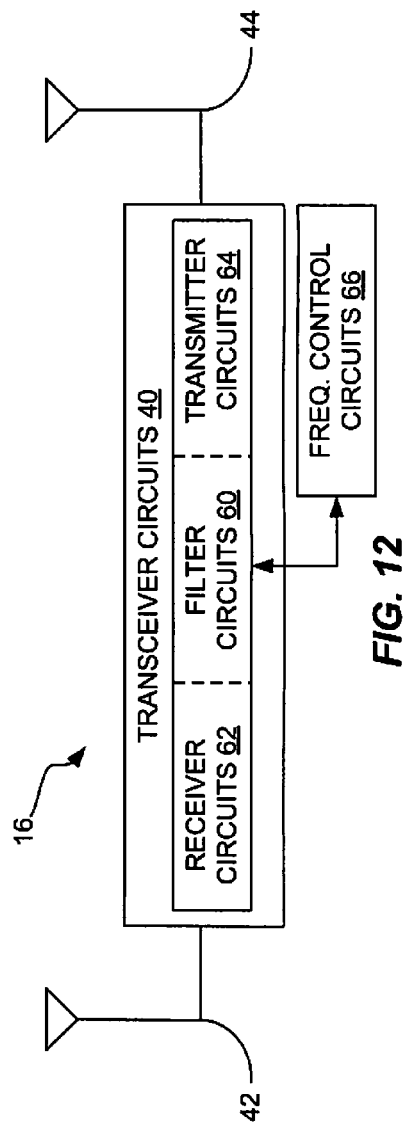
FIG. 12 is a block diagram of another embodiment of a repeater configured for soft activation/inactivation.

Further, in at least one embodiment, the repeater 16 is configured as a frequency-selective repeater, such as where it repeats signals only within a defined portion of an overall bandwidth. For example, in an LTE Advanced or other OFDM (or SC-FDMA) embodiment, the repeater 16 may be configured to repeat only selected OFDM sub-carriers, or selected subsets of such carriers. A non-limiting example of a frequency-selective embodiment of the repeater is shown in FIG. 12.

In the illustration, the repeater 16 includes one or more filter circuits 60 configured to provide frequency-selective repeater transmission, such that the repeater 16 provides repeat transmission for certain frequencies or frequency bands according to the transmit gain. In more detail, the illustrated embodiment includes receiver (front-end) circuits 62, which provide antenna-received signals for repeating to the filter circuits 60. In one example, the filter circuits 60 operate at least partially in the analog domain and cooperate with the receiver circuits 62 to provide frequency-selective signal reception, such that only desired frequencies or frequency bands are passed along to transmitter circuits 64, for repeater transmission.

In one or more other embodiments, the filter circuits operate in the digital domain. However, in either case, they may operate responsive to configuration and/or control signals from one or more frequency control circuits 66, which may be functionally implemented in or as part of the processing circuits 48 introduced in FIG. 11.

Broadly, then, the repeater 16 is implemented as a frequency-selective repeater in one or more embodiments, such that it provides frequency selective (transmit) gain control in accordance with the soft activation/inactivation teachings presented herein. This implies e.g. that the repeater 16 only amplifies the signal on certain resources in the frequency domain. For LTE and other Orthogonal Frequency Division Multiple Access (OFDMA) systems, the filter circuits 60 can have different granularity levels measured, for example, in terms of resource blocks—where a resource block is a given time/frequency allocation. Also, as regards frequency-selective operation, the repeater 16 is configured in one or more embodiments to perform ramping independently for different frequency bands.

For an LTE implementation of the network 10, base station (eNB) 12, and repeater 16, the eNB sends the uplink (UL) resource allocation to a mobile terminal 18 some time in advance. To exemplify, a mobile terminal 18 (user) that is supposed to transmit on the UL data channel (referred to as the PUSCH) at subframe n receives a grant for this allocation on the Physical Downlink Control Channel (PDCCH) at subframe n−4. This implies that the repeater 16 can, by picking up the regular control signaling transmitted between eNB and user, obtain resource allocation information (time and frequency) for the user. Thus, even with a 1-2 ms interception delay in the repeater 16, the repeater 16 can amplify the correct signal(s) and avoid amplifying and forwarding less useful information.

Regarding repeater transmissions on the LTE downlink (DL), however, there are more significant challenges in the repeater determining resource allocation information for a given mobile terminal 18. This is because of the standardized allocation of PDCCH/PDSCH (Physical Dedicated Control Channel/Physical Dedicated Shared Channel) in the OFDM grid. More specifically, scheduling assignment information is transmitted during the same sub-frame as the PDSCH allocation, which makes it challenging for the repeater 16 to receive a sub-frame and decode control channel messages on the PDCCH fast enough to enable it to provide repeater amplification of the data channel on specific resource assignments, at least within the time constraints associated with the signal's cyclic prefix timing.

Even so, the eNB can instruct the repeater 16 to be turned on only for a specific region of the frequency band, and then prioritize scheduling of a mobile terminal 18 that needs the repeater's services on that particular region some number of sub-frames later. The repeater 16 could also track the PDCCH assignments and if it notes that a specific mobile terminal 18 is no longer scheduled on the particular resource region, it stops amplifying or starts to ramp down the repeater gain of that resource region.

Alternatively, in a more advanced approach, one or more eNBs or other network elements exploit a known cell resource sharing scheme for the repeaters 16. One such example of cell resource sharing scheme is termed "inter-cell-interference-coordination" (ICIC). In such cases, a given eNB—acting as a controlling base station 12 for a repeater 16—can control cell edge resource allocations to follow the known resource reuse scheme. Thus, resource allocations can be varied for given mobile terminals 18, in dependence on their locations within a cell, and, correspondingly, depending on whether they rely on one or more repeaters 16 for UL and/or DL transmissions.

In the same or other embodiments, the base station 12, whether functioning as an eNB in an LTE or other type of network that uses user scheduling, is configured to implement a method of transmission scheduling comprising scheduling one or both of uplink and downlink transmissions on an ongoing basis, for a plurality of mobile terminals 18 being supported by the base station, and associating one or more of the mobile terminals with a remote repeater 16 that uses soft activation and soft inactivation. As described herein, such a repeater employs a controlled upward ramping of its transmit gain when activated and employs a controlled downward ramping of its transmit gain when inactivated.

In consideration of such repeater behavior, a base station method further includes activating the repeater 16, as needed, in advance of any scheduled transmission involving one of the associated mobile terminals 18, to accommodate the soft activation of the repeater 18. That is, in at least one embodiment, the base station 12 considers the time needed for the repeater 16 to ramp up to a useful level of transmit gain, and it factors that timing into its user scheduling and repeater control decisions. For example, the base station 12 might defer scheduling of a user associated with a repeater 16 until such time as the repeater's gain has been ramped up, or it might otherwise schedule another user not reliant on the repeater 16, based on its knowledge (or assumptions) of where the repeater 16 was at time-wise in terms of its controlled transmit gain ramping.

FIG. 13 illustrates base station processing logic along the above lines, wherein the base station 12 associates one or more mobile terminals 18 with a given repeater 16 (Block 130) and then conducts ongoing scheduling operations in consideration of those associations (Block 132). Note that the association may be transparent to the mobile terminals 18, and even to the repeater 16 in at least some embodiments.

For example, "associate" in one embodiment simply means that the base station 12 records or otherwise identifies which mobile terminals 18 are operating within an area covered by the repeater 16 and remembers that association for purposes of scheduling and/or repeater activation timing control. In one or more other embodiments, "associate" further means that the base station 12 indicates to the repeater 16 which mobile terminals 18 it is supporting. These indications are particularly useful where, for example, the repeater 16 autonomously activates and inactivates, as needed.

In any case, FIG. 14 illustrates further details for Block 132 in FIG. 13, wherein conducting ongoing scheduling operations comprises determining that transmission to or from an associated user is scheduled or pending (Block 132-1). On that determination, the base station 12 activates the repeater 16 in advance of the pending transmission (Block 132-2).

FIG. 15 illustrates one embodiment of a base station 12 that is configured to carry out the above method. The illustrated base station includes transceiver circuits 70 for transmitting DL signals and receiving UL signals, and includes associated control/processing circuits 72. These circuits may comprise hardwired circuitry, software-based circuitry, or both. For example, the base station 12 may include one or more than one microprocessor-based circuit, along with supporting memory or other computer-readable medium for storing program instructions that, when executed, particularly configure the microprocessor-based circuit(s) to carry out the above method, or variations of it.

As shown, the processing/control circuits 72 include a scheduler 74, which is configured to perform user scheduling on the UL and/or the DL. In at least one embodiment, such scheduling comprises determining resource allocations—e.g. time and/or frequency allocations—at least for high-rate users. The control/processing circuits 72 also may include a gain controller 76, which is configured to control at least some aspects of soft activation/inactivation by the repeater 16. In any case, the scheduler 74 is configured to schedule one or both of uplink and downlink transmissions on an ongoing basis, for a plurality of mobile terminals 18 being supported by the base station 12, and associate one or more of the mobile terminals 18 with a remote repeater 16 that uses soft activation and soft inactivation. Further, the scheduler 74 is configured to activate the repeater 16, as needed, in advance of any scheduled transmission involving one of the associated mobile terminals 18, to accommodate the soft activation/inactivation of the repeater 16.

As for that soft activation/inactivation, it can be broadly understood as implementing a ramping function of the (transmit) gain in the repeater 16. The ramping function or control therefore can be implemented in the base station 12 of an associated network cell 14, or in the repeater 16. The gain control itself can be implemented in the analog domain, or, at least control-wise, can be implemented in the digital domain of the repeater 16. For example, the power, biasing, and/or configuration of one or more amplifiers within the receive/transmit signal chain of the repeater can be controlled to effect the desired transmit gain ramping.

As noted, the ramping function can be applied to DL gain and/or to UL gain. For the DL, the repeater 16 generally will have an established association to a controlling cell 14 and turns on or is turned on when the controlling cell 14 is transmitting on the DL. As noted, the repeater 16 turns on with a certain (low) gain and, then, for each sub-frame it is active, corresponding to when the controlling cell 14 is transmitting, the repeater 16 increases the transmit gain iteratively. The step size or ramping function used for such increasing is, in one or more embodiments, configurable. Similarly, during inactive transmission sub-frames, the repeater 16 lowers its gain according to the same or a different step size.

Thus, in one or more embodiments, the gain is allowed to increase until reaching an appropriate target value, such as the maximum gain value of the repeater 16. Another consequence is that the repeater 16 does not turn off directly after a finalized data transfer, but requires some time depending on the gain and time step sizes (or function) used to ramp the repeater's transmit gain down. Such a scheme has direct applicability to the DL, and the establishment of a repeater-to-cell connection or association can be done using signaling.

Using soft activation/inactivation on DL repeater operations provides for smoother (interference) measuring operations at the mobile terminals 18. Consequently, Channel Quality Information (CQI) reporting by the mobile terminals 18 is more stable, meaning that radio link adaptations made in consideration of those CQI reports is more stable. Further, mobility measurements are more stable, thus helping to avoid "ping-pong" handovers, etc.

In the same or another embodiment, the repeater 16 is configured to apply a ramping scheme to control the uplink gain. Here, such operations may be based on the repeater 16 having an established association to a set of "active" users, such that it turns on (or is otherwise activated) only when one of these users transmits. When turned on, the repeater starts with a certain (low) gain. Then, for each sub-frame it is active, corresponding to when the "active" users are transmitting (i.e. the controlling cell 14 is receiving), the repeater 16 increases the gain with a certain (optionally configurable) step size. Further, during inactive sub-frames, the repeater 16 lowers its gain according to the same or a different step size. The gain is allowed to increase until reaching the maximum gain value of the repeater 16, and, as on the DL repeating operation, the repeater 16 does not turn off directly after a finalized data transfer. Instead, the repeater 16 performs a controlled ramp down until the gain is back to zero or some minimum level, and the repeater is regarded as off or in standby. Such operations can be done for the LTE uplink, and the establishment of the repeater to mobile terminal relations can be done using signaling between the controlling cell 14 and the repeater 16.

Providing soft activation/inactivation on the UL provides a smoother received power level at the base station 12 and may also mitigate the risk that the received power on contiguous regions of the base station's receive bandwidth differ too much. Further, the UL power control functionality of LTE will not be disturbed by the soft activation/inactivation, as it otherwise might be with rapid activation/inactivation of repeaters. Note that the interested reader may refer to TR 36.201, "Evolved Universal Terrestrial Radio Access (E-UTRA); Long Term Evolution (LTE) physical layer" for a general description of the LTE Advanced physical layer, and to TR 36.213, "Evolved Universal Terrestrial Radio Access (E-UTRA); Physical layer procedures" for more details.

Of course, the present invention is not limited to by foregoing description, or by the accompanying drawings. Indeed, the present invention is limited only by the following appended claims and their legal equivalents.

What is claimed is:

1. A method of transmit gain control in a repeater that is selectively activated and inactivated within a wireless communication network, the method comprising:
   ramping a transmit gain of the repeater upward according to a defined ramping profile, in response to the repeater being activated;
   ramping the transmit gain of the repeater downward according to the defined ramping profile, in response to the repeater being inactivated; and
   wherein the repeater at least temporarily stores the defined ramping profile as one or more gain step and time step values, and wherein ramping the transmit gain of the repeater upward or downward comprises the repeater incrementing or decrementing the transmit gain according to the gain step and time step values.

2. The method of claim 1, further comprising activating the repeater based on detecting, at the repeater, signal transmission activity by one or more other particular entities in the wireless communication network, and inactivating the repeater by detecting, at the repeater, cessation of the signal transmission activity.

3. The method of claim 1, further comprising activating and inactivating the repeater based on the repeater receiving activation and inactivation control signaling, respectively, from a controlling base station.

4. The method of claim 1, further comprising receiving at the repeater the one or more gain step and time step values via signaling from a controlling base station.

5. The method of claim 1, further comprising, in response to being activated while still ramping down the transmit gain from a prior inactivation, ending the ramping down of the transmit gain and initiating upward ramping of the transmit gain from a current value of the transmit gain, in accordance with the defined ramping profile and subject to a maximum value of the transmit gain.

6. The method of claim 1, further comprising, in response to being inactivated while still ramping up the transmit gain from a prior activation, ending the ramping up of the transmit gain and initiating downward ramping of the transmit gain from a current value of the transmit gain, in accordance with the defined ramping profile and subject to a minimum value of the transmit gain.

7. The method of claim 1, wherein, when the repeater is active, amplifying received signals on a frequency-selective basis, such that the repeater provides repeat transmission for certain frequencies or frequency bands according to the transmit gain.

8. A method of transmit gain control in a repeater that is selectively activated and inactivated within a wireless communication network, the method comprising:
   ramping a transmit gain of the repeater upward according to a defined ramping profile, in response to the repeater being activated;
   ramping the transmit gain of the repeater downward according to the defined ramping profile, in response to the repeater being inactivated; and
   wherein ramping the transmit gain of the repeater upward or downward comprises the repeater receiving a time sequence of relative upward or downward transmit gain adjustment commands from a controlling base station, storing or otherwise having access to the defined ramping profile.

9. A method of transmit gain control in a repeater that is selectively activated and inactivated within a wireless communication network, the method comprising:
   ramping a transmit gain of the repeater upward according to a defined ramping profile, in response to the repeater being activated;
   ramping the transmit gain of the repeater downward according to the defined ramping profile, in response to the repeater being inactivated; and
   wherein the repeater is configured for downlink repeater operation in which the repeater is activated for downlink transmissions from a controlling base station to one or more mobile terminals, and wherein ramping the transmit gain of the repeater upward comprises starting from a minimum value or a last-set value of the transmit gain and incrementing the transmit gain for each succeeding transmit interval in which the repeater is active, subject to reaching a maximum value for the transmit gain, and wherein ramping the transmit gain of the repeater downward comprises starting from the maximum value or a last-set value of the transmit gain and decrementing the transmit gain for each succeeding transmit interval in which the repeater is inactive, subject to the reaching the minimum value.

10. A method of transmit gain control in a repeater that is selectively activated and inactivated within a wireless communication network, the method comprising:
   ramping a transmit gain of the repeater upward according to a defined ramping profile, in response to the repeater being activated;

ramping the transmit gain of the repeater downward according to the defined ramping profile, in response to the repeater being inactivated; and wherein the repeater is configured for uplink repeater operation in which the repeater is activated for uplink transmissions from one or more mobile terminals to a controlling base station, and wherein ramping the transmit gain of the repeater upward comprises starting from a minimum value or a last-set value of the transmit gain and incrementing the transmit gain for each succeeding transmit interval in which the repeater is active, subject to reaching a maximum value for the transmit gain, and wherein ramping the transmit gain of the repeater downward comprises starting from the maximum value or a last-set value of the transmit gain and decrementing the transmit gain for each succeeding transmit interval in which the repeater is inactive, subject to the reaching the minimum value.

11. A repeater that is configured for selective activation and inactivation within a wireless communication network, the repeater comprising:
    a transceiver having a variable transmit gain for repeating received signals; and
    a transmit gain controller that is configured to:
        ramp a transmit gain of the repeater upward according to a defined ramping profile, in response to the repeater being activated;
        ramp the transmit gain of the repeater downward according to the defined ramping profile, in response to the repeater being inactivated; and
        wherein the repeater at least temporarily stores the defined ramping profile as one or more gain step and time step values, and wherein the transmit gain controller ramps the transmit gain of the repeater upward or downward by incrementing or decrementing the transmit gain according to the gain step and time step values.

12. The repeater of claim 11, wherein the repeater includes an activation controller that is configured to activate the repeater, wherein the repeater is active for signal repeating, based on detecting signal transmission activity by one or more other particular entities in the wireless communication network, and is configured to inactivate the repeater, wherein the repeater is not active for signal repeating, based on detecting cessation of the signal transmission activity.

13. The repeater of claim 11, wherein the repeater includes an activation controller that is configured to activate or inactivate the repeater based on receiving activation or inactivation control signaling, respectively, from a controlling base station.

14. The repeater of claim 11, wherein the repeater is configured to receive the one or more gain step and time step values via signaling from a controlling base station.

15. The repeater of claim 11, wherein the transmit gain controller, in response to the repeater being activated while the transmit gain controller is still ramping down the transmit gain from a prior inactivation, ends the ramping down of the transmit gain and initiates upward ramping of the transmit gain from a current value of the transmit gain, in accordance with the defined ramping profile and subject to a maximum value of the transmit gain.

16. The repeater of claim 11, wherein the transmit gain controller, in response to the repeater being inactivated while the transmit gain controller is still ramping up the transmit gain from a prior activation, ends the ramping up of the transmit gain and initiates downward ramping of the transmit gain from a current value of the transmit gain, in accordance with the defined ramping profile and subject to a minimum value of the transmit gain.

17. The repeater of claim 11, wherein the repeater includes one or more filter circuits configured to provide frequency-selective repeater transmission, such that the repeater provides repeat transmission for certain frequencies or frequency bands according to the transmit gain.

18. A repeater that is configured for selective activation and inactivation within a wireless communication network, the repeater comprising:
    a transceiver having a variable transmit gain for repeating received signals; and
    a transmit gain controller that is configured to:
        ramp a transmit gain of the repeater upward according to a defined ramping profile, in response to the repeater being activated;
        ramp the transmit gain of the repeater downward according to the defined ramping profile, in response to the repeater being inactivated; and
    wherein the transmit gain controller ramps the gain of the repeater upward or downward responsive to the repeater receiving a time sequence of upward or downward transmit gain adjustment commands from a controlling base station, storing or otherwise having access to the defined ramping profile.

19. A repeater that is configured for selective activation and inactivation within a wireless communication network, the repeater comprising:
    a transceiver having a variable transmit pain for repeating received signals; and
    a transmit gain controller that is configured to:
        ramp a transmit pain of the repeater upward according to a defined ramping profile, in response to the repeater being activated;
        ramp the transmit gain of the repeater downward according to the defined ramping profile, in response to the repeater being inactivated; and
    wherein the repeater is configured for downlink repeater operation in which the repeater is activated for downlink transmissions from a controlling base station to one or more mobile terminals, and wherein the transmit gain controller ramps the transmit gain of the repeater upward by starting from a minimum value or a last-set value of the transmit gain and incrementing the transmit gain for each succeeding transmit interval in which the repeater is active, subject to reaching a maximum value for the transmit gain, and wherein the transmit gain controller ramps the transmit gain of the repeater downward by starting from the maximum value or a last-set value of the transmit gain and decrementing the transmit gain for each succeeding transmit interval in which the repeater is inactive, subject to the reaching the minimum value.

20. A repeater that is configured for selective activation and inactivation within a wireless communication network, the repeater comprising:
    a transceiver having a variable transmit gain for repeating received signals; and
    a transmit gain controller that is configured to:
        ramp a transmit gain of the repeater upward according to a defined ramping profile, in response to the repeater being activated;
        ramp the transmit gain of the repeater downward according to the defined ramping profile, in response to the repeater being inactivated; and wherein the repeater is configured for uplink repeater operation in which the repeater is activated for uplink transmissions from one or more mobile terminals to a controlling base station, and wherein the transmit gain controller ramps the transmit gain of the repeater upward by starting from a minimum value or a last-set value of the transmit gain and incrementing the transmit gain for each succeeding transmit interval in which the repeater is active, subject to reaching a maximum value for the transmit gain, and wherein the transmit gain controller ramps the transmit gain of the repeater downward by starting from the maximum value or a last-set value of the transmit gain and decrementing the transmit gain for each succeeding transmit interval in which the repeater is inactive, subject to the reaching the minimum value.

21. A method of transmission scheduling in a base station configured for use in a wireless communication network, the method comprising:

scheduling one or both of uplink and downlink transmissions on an ongoing basis, for a plurality of mobile terminals being supported by the base station;

associating one or more of the mobile terminals with a remote repeater that uses soft activation and soft inactivation, wherein the remote repeater employs a controlled upward ramping of its transmit gain when activated and employs a controlled downward ramping of its transmit gain when inactivated;

activating the repeater, as needed, in advance of any scheduled transmission involving one of the associated mobile terminals, to accommodate the soft activation of the repeater; and transmitting a time sequence of relative upward or downward transmit gain adjustment commands to the remote repeater which uses the time sequence of relative upward or downward transmit gain adjustments commands to employ the controlled upward ramping of its transmit gain when activated or to employ the controlled downward ramping of its transmit gain when inactivated.

* * * * *

UNITED STATES PATENT AND TRADEMARK OFFICE
CERTIFICATE OF CORRECTION

| | | |
|---|---|---|
| PATENT NO. | : 8,213,353 B2 | Page 1 of 1 |
| APPLICATION NO. | : 12/547773 | |
| DATED | : July 3, 2012 | |
| INVENTOR(S) | : Moberg et al. | |

It is certified that error appears in the above-identified patent and that said Letters Patent is hereby corrected as shown below:

IN THE SPECIFICATIONS:

In Column 5, Line 14, delete "used," and insert -- used --, therefor.

IN THE CLAIMS:

In Column 14, Line 60, in Claim 9, delete "to the reaching" and insert -- to reaching --, therefor.

In Column 16, Line 31, in Claim 19, delete "pain" and insert -- gain --, therefor.

In Column 16, Line 34, in Claim 19, delete "pain" and insert -- gain --, therefor.

Signed and Sealed this
Ninth Day of October, 2012

David J. Kappos
*Director of the United States Patent and Trademark Office*